(12) United States Patent
Sakabe et al.

(10) Patent No.: US 6,654,527 B2
(45) Date of Patent: Nov. 25, 2003

(54) OPTICAL FIBER CABLE

(75) Inventors: Itaru Sakabe, Yokohama (JP);
Nobuhiro Akasaka, Yokohama (JP);
Masayoshi Yamano, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/270,265

(22) Filed: Oct. 15, 2002

(65) Prior Publication Data

US 2003/0081918 A1 May 1, 2003

(30) Foreign Application Priority Data

Oct. 18, 2001 (JP) ........................................ 2001-320071

(51) Int. Cl.[7] ................................................. G02B 6/44
(52) U.S. Cl. ....................................................... 385/114
(58) Field of Search ................................. 385/100, 103, 385/105, 109, 114

(56) References Cited

U.S. PATENT DOCUMENTS

| | | | | |
|---|---|---|---|---|
| 4,900,126 A | * | 2/1990 | Jackson et al. | 385/114 |
| 5,189,721 A | * | 2/1993 | Sayegh et al. | 385/114 |
| 5,717,805 A | * | 2/1998 | Stulpin | 385/114 |
| 6,134,364 A | * | 10/2000 | DeFabritis et al. | 385/114 |
| 6,185,350 B1 | * | 2/2001 | Tachikura et al. | 385/102 |
| 6,370,304 B1 | * | 4/2002 | Mills et al. | 385/114 |
| 6,577,797 B2 | * | 6/2003 | Quiroz | 385/114 |

FOREIGN PATENT DOCUMENTS

JP 2793621 6/1998

* cited by examiner

Primary Examiner—Tulsidas Patel
(74) Attorney, Agent, or Firm—McDermott, Will & Emery

(57) ABSTRACT

An optical fiber cable having excellent workability and long-term reliability. The cable comprises at least one optical fiber, a plastic jacket covering the optical fiber or optical fibers, and at least one anti-shrink member embedded in the jacket. The jacket has a longitudinal shrinkage of at most 0.5% when heated at 110° C. for two hours. The cable has a remaining bend with a radius of curvature of at least 100 mm when wound on a 50-mm-radious mandrel and heated at 85° C. for two hours. The deflection of a 30-cm-long cantilever made of the cable is at least 50 mm. In one aspect of the cable, the cable is specified by the conditions of $ES_t/ES_j \geq 0.7$, $EI_t/EI_c \geq 0.1$, and $EI_c/M_c \leq 8\times10^6$ mm$^3$ (E: Young's modulus; S: cross-sectional area; t: total of anti-shrink members; j: jacket; I: geometrical moment of inertia; c: cable; and M: mass).

20 Claims, 3 Drawing Sheets

OPTICAL FIBER CABLE

BACKGROUND OF THE INVENTION

1. Field of the Invention

The present invention relates generally to an optical fiber cable for use mainly in indoor wiring, and particularly to an optical fiber cable provided with at least one anti-shrink member and a plastic jacket.

2. Description of the Background Art

An optical fiber cable for use in indoor wiring usually has a structure in which tension members are placed around a plurality of optical fibers, and a plastic jacket is provided as an outer covering. It is usual that the jacket shrinks longitudinally with time due to residual stresses produced during the covering process. When the longitudinal shrinkage of the jacket is large, stresses are applied to the optical fibers. The stresses may affect the transmission properties of the optical fibers.

To suppress the shrinkage of the jacket, researchers and engineers have been studying a structure in which anti-shrink members are embedded in the jacket. On the other hand, as multi-fiber connectors are widely used for connecting a plurality of optical fibers as one unit, optical transmission lines frequently use optical fiber cables having a fiber ribbon, in which multiple optical fibers are organized in a flat array. Japanese patent 2793621 has disclosed a structure in which a fiber ribbon is enclosed by a jacket in which tension members are embedded. The tension members also function as anti-shrink members for suppressing the longitudinal shrinkage of the jacket.

SUMMARY OF THE INVENTION

An object of the present invention is to solve the above-described problem and to offer an optical fiber cable having excellent workability and long-term reliability.

According to the present invention, the foregoing and other objects and advantages are attained by offering an optical fiber cable described below. The optical fiber cable comprises the following components:

(a) at least one optical fiber;
(b) a plastic jacket covering the optical fiber or optical fibers; and
(c) at least one anti-shrink member that is embedded in the jacket and that is intended to suppress the longitudinal shrink of the jacket.

In this cable, the jacket has the property that the longitudinal shrinkage is at most 0.5% when a sample of the jacket including the anti-shrink member or members but excluding the optical fiber or fibers is heated at 110° C. for two hours. The optical fiber cable has the following properties:

(a) The remaining bend of the cable has a radius of curvature of at least 100 mm when a sample of the cable is wound on a mandrel having a radius of 50 mm, is secured there, is heated at 85° C. for two hours, and then is unwound from the mandrel.
(b) The deflection at the free end of a cantilever is at least 50 mm when the cantilever is formed by using a sample of the cable having a length of 30 cm and when the deflection is obtained by averaging the maximum deflection and the minimum deflection. In this case, the value of the maximum deflection is obtained by turning the cable sample around its own axis to find the position where the deflection at the free end is maximized due to the bending tendency of the cable sample. The value of the minimum deflection is obtained by turning the cable sample again around its own axis to find the position where the deflection at the free end is minimized due to the bending tendency.

In accordance with one aspect of the invention, the optical fiber cable has the following properties:

(a) The ratio $ES_t/ES_j$ is at least 0.7, where $ES_t$ denotes the product of the Young's modulus and cross-sectional area of the anti-shrink member or the total value of the products of the Young's modulus and cross-sectional area of the anti-shrink members, and $ES_j$ denotes the product of the Young's modulus and cross-sectional area of the entire jacket including the anti-shrink member or members;

(b) The ratio $EI_t/EI_c$ is at least 0.1, where $EI_t$ denotes the flexural rigidity of the anti-shrink member or the total value of the flexural rigidities of the anti-shrink members (the flexural rigidity is expressed by the product of the Young's modulus and the geometrical moment of inertia), and $EI_c$ denotes the flexural rigidity of the entire cable.

(c) The ratio $EI_c/M_c$ is at most $8 \times 10^6$ mm$^3$, where $EI_c$ denotes the flexural rigidity of the entire cable, and $M_c$ denotes the mass per unit length of the cable.

The optical fiber cable may have the dimensional relationship expressed as $$T_t \leq T_o + 0.2 \ (mm),$$

where $T_t$ is the total thickness of the jacket at the portion where the anti-shrink member or members are embedded, and $T_o$ is the thickness of the jacket at the portion where no anti-shrink member is embedded.

In the optical fiber cable, the anti-shrink member or members may be coated with a bonding material by baking. In this case, the bonding material may have a thickness of at most 50 μm. The bonding material before being applied onto the anti-shrink member or members may be composed of an acrylic-resin-family bonding material dispersed in a solvent.

The optical fiber cable may further comprise a tension member surrounding the optical fiber or fibers and being surrounded by the jacket.

In the optical fiber cable, the jacket may be made of polyvinyl chloride (PVC), and the anti-shrink member or members may be made of glass-fiber-reinforced plastic (G-FRP).

The present invention is further explained below by referring to the accompanying drawings. The drawings are provided solely for the purpose of illustration and are not intended to limit the scope of the invention.

DETAILED DESCRIPTION OF THE INVENTION

Figure 1:
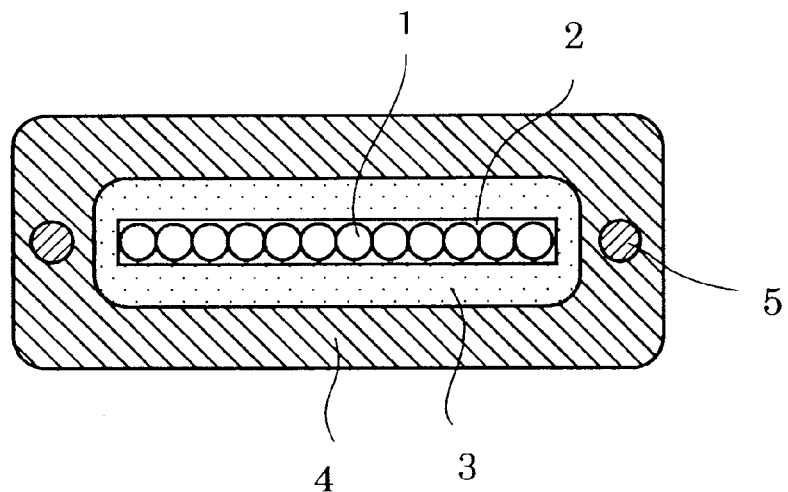
FIG. 1 is a cross-sectional view showing an embodiment of the optical fiber cable of the present invention.

Embodiments of the present invention are explained below by referring to the accompanying drawings. In the drawings, the same number refers to the same part to avoid duplicated explanation. The ratios of the dimensions in the drawings do not necessarily coincide with the explanation.

It is important for an optical fiber cable for indoor-wiring use to have good workability at the time of installation and long-term reliability after the installation. When anti-shrink members are embedded in the jacket of a conventional optical fiber cable, the anti-shrink members increase the stiffness of the cable. As a result, the cable becomes difficult to bend, which means the cable has poor workability.

Optical fiber cables for indoor-wiring use are also required to have flame retardancy. To meet this requirement, the jacket is usually made of a material having high flame retardancy, such as polyvinyl chloride (PVC). Such a material usually has a poor property in bonding with the anti-shrink members. Consequently, slippage between the jacket and the anti-shrink members tends to occur. Even when the anti-shrink members have high stiffness, they may not suppress the longitudinal shrinkage of the jacket. Therefore, the long-term reliability is insufficient. To increase the bonding strength between the jacket and the anti-shrink members, the anti-shrink members can be coated with a bonding material having a good property in bonding with the jacket. In this case, the layer of the bonding material unavoidably increases the total thickness of the jacket, and it is difficult to find a material that has both a good property in bonding with the jacket and high flame retardancy.

FIG. 1 is a cross-sectional view showing an embodiment of the optical fiber cable of the present invention. In this embodiment, a plurality of optical fibers 1 coated with ultraviolet (UV)-cured resin are organized in a flat array. The array is consolidated by applying another coating of UV-cured resin around the array to form a fiber ribbon 2. The fiber ribbon 2 is surrounded by a tension member 3 made of aramid fiber. The tension member 3 is covered with a jacket 4, in which anti-shrink members 5 are embedded at the outside of the outermost fibers in the array.

Figure 2:
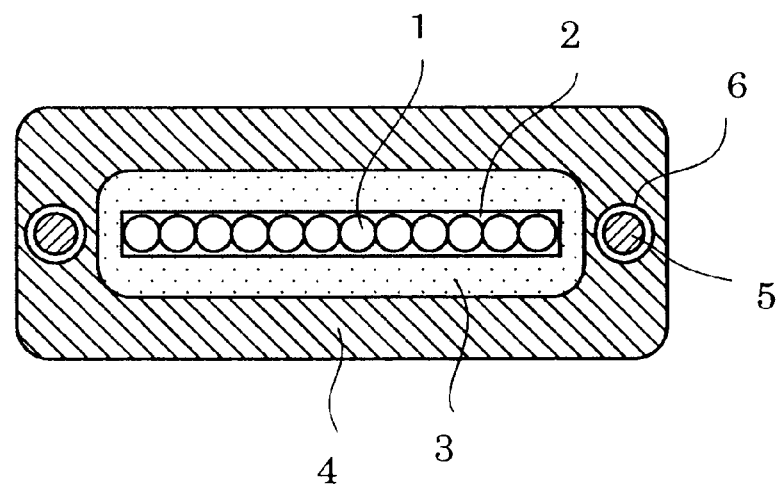
FIG. 2 is a cross-sectional view showing another embodiment of the optical fiber cable of the present invention.

FIG. 2 is a cross-sectional view showing another embodiment of the optical fiber cable of the present invention. In this embodiment, the anti-shrink members 5 are coated with a bonding-material layer 6.

Figure 3:
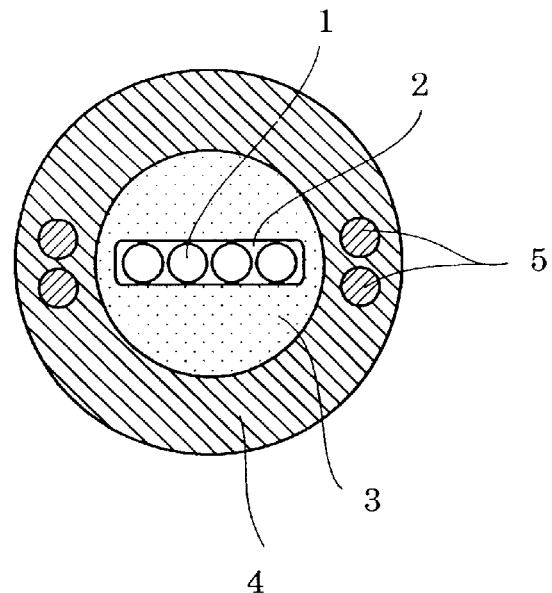
FIG. 3 is a cross-sectional view showing yet another embodiment of the optical fiber cable of the present invention.

FIG. 3 is a cross-sectional view showing yet another embodiment of the optical fiber cable of the present invention. In this embodiment, a fiber ribbon 2 is surrounded by an approximately circular tension member 3 made of aramid fiber. The tension member 3 is covered with a jacket 4, in which two anti-shrink members 5 are embedded at the outside of each of the outermost fibers in the array. As shown in this embodiment, the present invention can be applied to a cable having a circular cross section. More specifically, the present invention can be applied not only to a cable having a fiber ribbon but also to a cable having multiple optical fibers stranded together to form a circular cross section. This embodiment also shows that a plurality of anti-shrink members may be provided at the outside of each of the outermost fibers in the array.

Although the optical fiber cables shown in FIGS. 1 to 3 use a plurality of anti-shrink members 5, an optical fiber cable may use one anti-shrink member when a plurality of anti-shrink members are not required.

Various optical fiber cables having the structure shown in FIG. 1 were produced by changing the size of the anti-shrink members 5 to study the relationship between the size of the anti-shrink members 5 and the properties of the cable. The jacket 4 was made of PVC (brand name: APCO R2002). The anti-shrink members 5 were made of glass-fiber-reinforced plastic (G-FRP). The cable had an overall width of 4.8 mm and an overall thickness of 2.4 mm. The jacket 4 had a thickness of 0.5 mm at about the midpoint position of the cable's width.

First, a study was conducted to evaluate the shrinking property of the cable. The longitudinal shrinkage was measured by the following steps:

(a) The optical fibers and the aramid fiber were drawn out of a short length of the cable to obtain a sample of the jacket including the anti-shrink members.

(b) The sample was cut to a length of 1.1 m, and two reference points were marked at a separation of 1 m.

(c) The sample was placed on a layer of talc laid in a container and heated at 110° C. for two hours.

(d) The sample was cooled and maintained at 23° C. for one hour to measure the separation between the two reference points to obtain the longitudinal shrinkage.

Figure 4:
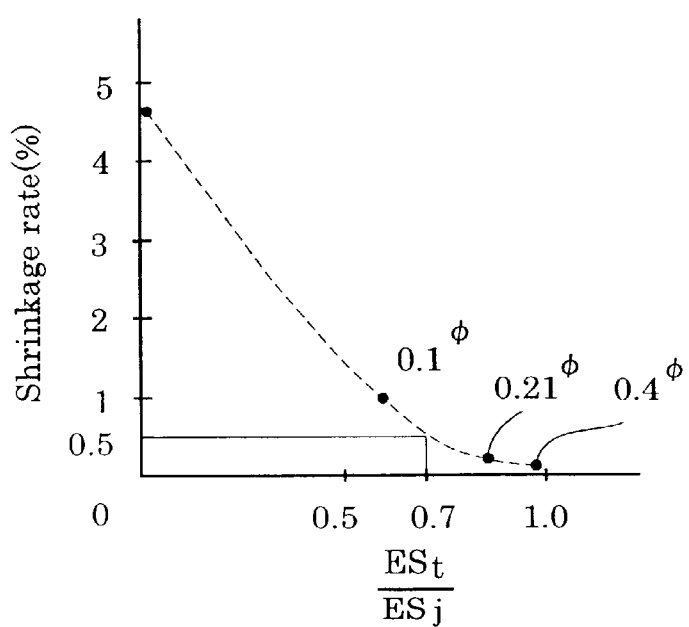
FIG. 4 is a graph showing the relationship between the longitudinal shrinkage of the jacket and a parameter expressing the structure of the optical fiber cable.

The measured results are shown in FIG. 4. In FIG. 4, the abscissa of the graph represents the ratio $ES_t/ES_j$. Here, $ES_t$ denotes the total value of the products of the Young's modulus and cross-sectional area of the anti-shrink members, and $ES_j$ denotes the product of the Young's modulus and cross-sectional area of the entire jacket including the anti-shrink members. As shown in the graph, when the diameter of the anti-shrink members 5 is 0.21 mm, the longitudinal shrinkage is less than 0.5%, and when the diameter is 0.1 mm, the longitudinal shrinkage is about 1%. In other words, when the anti-shrink members 5 have a large size to a certain extent, the anti-shrink members 5 overcome the stress acting to shrink the jacket longitudinally with time, enabling the suppression of the shrink. It is required to reduce the longitudinal shrinkage to at most 0.5% to prevent the shrink of the jacket from deteriorating the cable properties. According to FIG. 4, this requirement can be met when the ratio $ES_t/ES_j$ is increased to at least 0.7.

Second, another study was conducted to obtain the relationship between the size of the anti-shrink members 5 and the bending tendency of the cable. The relationship was obtained by the following steps:

(a) A sample of the optical fiber cable having a length of 30 cm was wound on a mandrel having a radius of 50 mm to be secured there with a length of glass tape.

(b) The sample cable was heated at 85° C. for two hours.

(c) The sample cable was unwound from the mandrel.

(d) The sample cable was hung vertically to measure the radius of curvature of a bending portion remaining at the lower end portion of the cable.

Figure 5:
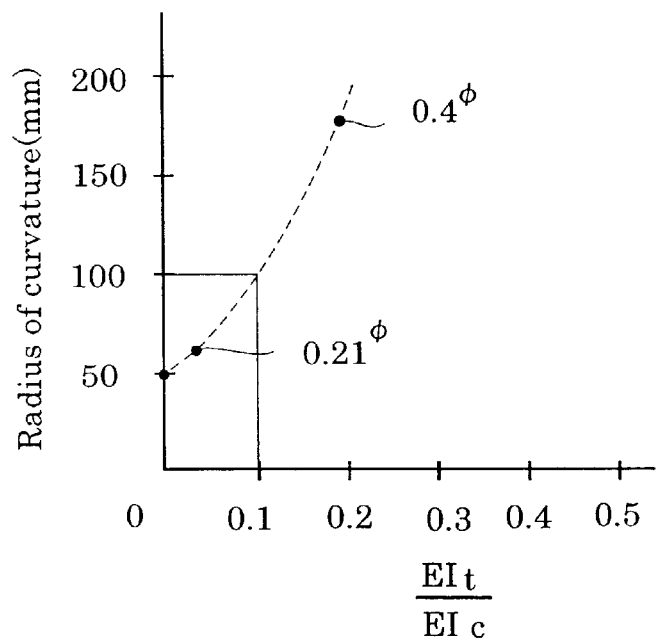
FIG. 5 is a graph showing the relationship between the remaining magnitude of bend of the cable and another parameter expressing the structure of the optical fiber cable.

The measured results are shown in FIG. 5. In FIG. 5, the abscissa of the graph represents the ratio $EI_t/EI_c$. Here, $EI_t$ denotes the total value of the flexural rigidities of the anti-shrink members (the flexural rigidity is expressed by the product of the Young's modulus and the geometrical moment of inertia), and $EI_c$ denotes the flexural rigidity of the entire cable. As shown in the graph, when the ratio $EI_t/EI_c$ increases, and as the total value of the flexural rigidities of the anti-shrink members comes to govern the flexural rigidity of the entire cable, the radius of curvature increases. It is required to increase the radius of curvature to at least 100 mm for the bending tendency of the cable to be allowed. According to FIG. 5, this requirement can be met when the ratio $EI_t/EI_c$ is increased to at least 0.1.

Third, yet another study was conducted to evaluate the flexibility of the cable. The flexibility was evaluated by measuring the amount of deflection when one end of a sample cable was supported to form a cantilever. Considering the inevitable bending tendency given during the cable production, the amount of deflection was measured by the following steps:

(a) A reference mark was provided at a portion 30 cm away from one end of a sample cable.

(b) The sample cable was supported horizontally at the marked portion to form a cantilever. The cable was turned around its own axis to find the position where the deflection at the other end is maximized due to the bending tendency. Then, the maximum deflection was measured.

(c) The cable was again turned around its own axis to find the position where the deflection at the other end is minimized due to the bending tendency. Then, the minimum deflection was measured.

(d) The measured values of the maximum and minimum deflections were averaged.

Figure 6:
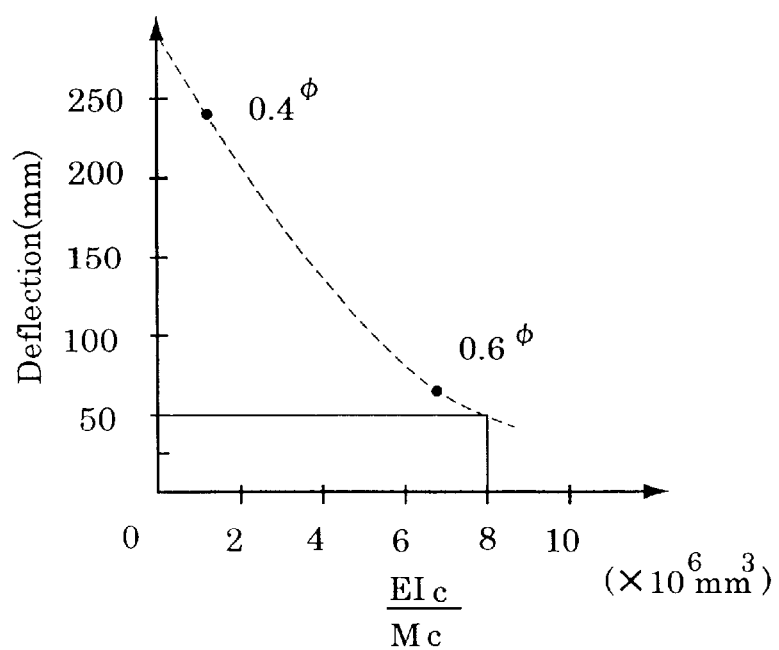
FIG. 6 is a graph showing the relationship between the deflection of the cable and yet another parameter expressing the structure of the optical fiber cable.

The measured results are shown in FIG. 6. In FIG. 6, the abscissa of the graph represents the ratio $EI_c/M_c$. Here, $EI_c$ denotes the flexural rigidity of the cable, and $M_c$ denotes the mass per unit length of the cable. As shown in the graph, as the ratio $EI_c/M_c$ decreases, the deflection increases. It is required to increase the deflection to at least 50 mm to obtain a cable having good flexibility and excellent workability. According to FIG. 6, this requirement can be met when the ratio $EI_c/M_c$ is decreased to at most $8\times10^6$ mm$^3$.

As described above, the optical fiber cable of the present invention can not only suppress the longitudinal shrink of the jacket and have superior long-term reliability but also have excellent workability because of its reduced bending tendency and good flexibility.

The optical fiber cable of the present invention can be produced by using the materials described below. The anti-shrink members 5 may be composed of a material such as a steel wire, fiber-reinforced plastic (FRP), or polyester yarn. Of these materials, it is desirable to use glass-fiber-reinforced plastic (G-FRP) because it has proper compression strength and stiffness. It is desirable that the anti-shrink members 5 composed of G-FRP have a minimal diameter considering the space to be embedded in the jacket 4. However, it is required that the diameter be at least 0.2 mm in order to withstand the longitudinal shrink of the jacket 4. On the other hand, it is desirable that the diameter be at most 0.9 mm to secure proper flexibility. Therefore, it is desirable that the anti-shrink members 5 have a diameter of 0.2 to 0.9 mm. It is also desirable that the jacket have the following dimensional relationship:

$$T_t \leq T_o + 0.2 \ (mm),$$

where $T_t$ is the total thickness of the jacket at the portion where the anti-shrink member or members are embedded, and $T_o$ is the thickness of the jacket at the portion where no anti-shrink member is embedded.

The jacket 4 may be made of thermoplastic resin such as PVC, polyethylene, fluororesin, or a polyester elastomer. Of these materials, PVC is widely used for indoor wiring because flame retardancy is one of the most important properties for this type of installation.

The bonding-material layer 6 for the cable shown in FIG. 2 is formed by the following process: First, the bonding material is applied to the surface of the anti-shrink member 5. Second, the bonding material is heated at a temperature of 100 to 300° C. to harden it. As the bonding material, it is desirable to use a material, such as acrylic resin, ethylene vinyl acetate resin, or nitrile rubber, dissolved in a solvent, such as benzene, toluene, or xylene.

The bonding material can be applied by passing the anti-shrink member 5 at a constant speed through a die assembly that is filled with the bonding material dissolved in a solvent. Then, the anti-shrink member 5 coated with the bonding material passes through a high-temperature furnace to be wound on a reel. The solvent volatilizes in the high-temperature furnace at a temperature of 100 to 300° C. to form the thin bonding-material layer 6.

It is desirable that the bonding-material layer 6 have a thickness of at most 50 $\mu$m. If the thickness is more than 50 $\mu$m, when the optical fiber cable is subjected to a combustion test, the bonding-material layer 6 readily burns, and the optical fiber cable fails to have sufficient flame retardancy.

To obtain sufficient flame retardancy and sufficient bonding strength between the jacket 4 and the anti-shrink members 5, it is desirable that the jacket 4 be made of PVC and that the bonding-material layer 6 be formed by applying and baking an acrylic-resin-family bonding material dispersed in a solvent. PVC has sufficient flame retardancy and has a comparatively good property in bonding with the acrylic-resin-family bonding material. The acrylic-resin-family bonding material dispersed in a solvent can form a thin coating by volatilizing the solvent. Therefore, even though the bonding material itself has poor flame retardancy, the bonding material has no significant effect on the overall flame retardancy of the optical fiber cable. It is desirable that the anti-shrink members 5 be composed of G-FRP. The plastic portion of the G-FRP can have sufficient strength in bonding with the acrylic-resin-family bonding material, and the flame retardancy can be improved by increasing the filling density of glass fiber.

The optical fiber cable of the present invention has excellent flame retardancy and meets the requirements stipulated in the Underwriters Laboratories (UL) Standard by showing a self-fire-extinguishing ability when tested by the UL 1666 riser test method.

EXAMPLE

A long optical fiber cable having the structure shown in FIG. 2 was produced. Twelve single-mode optical fibers 1 coated with UV-cured resin were organized in a flat array. The array was consolidated by applying another coating of UV-cured resin around the array to form a fiber ribbon 2. The fiber ribbon 2 was surrounded by a tension member 3 made of aramid fiber. The tension member 3 was covered with an extruded PVC jacket 4, in which G-FRP anti-shrink members 5 having a diameter of 0.4 mm were embedded at the outside of the outermost fibers in the array. The anti-shrink members 5 were coated in advance with a bonding-material layer 6 made of an acrylic-resin-family bonding material. Thus, the optical fiber cable having the structure shown in FIG. 2 was produced. The cable had an external size of 4.8×2.4 mm, and the jacket 4 had a thickness of 0.5 mm.

The jacket 4 was formed using PVC manufactured by APCO under a brand name of R200R. The bonding-material layer 6 having a thickness of 10 $\mu$m was formed by the following process: First, acrylic resin dissolved in toluene was applied to the surface of the G-FRP anti-shrink member 5 by using a die. Second, the toluene was volatilized by passing the anti-shrink member 5 through a high-temperature furnace at a temperature of 200° C.

As described above, when the ratio $ES_t/ES_j$ increases, the longitudinal shrinkage of the cable jacket decreases. Here, $ES_t$ denotes the total value of the products of the Young's modulus and cross-sectional area of the anti-shrink members, and $ES_j$ denotes the product of the Young's modulus and cross-sectional area of the entire jacket including the anti-shrink members. With the cable of this example, the value of $ES_t/ES_j$ was 0.9. According to FIG. 4, this value corresponds to a longitudinal shrinkage of less than 0.5%. The cable had a sufficiently small total flexural rigidity in comparison with the mass of the cable. Furthermore, the cable had a sufficiently large ratio of the total value of the flexural rigidities of the anti-shrink members to the flexural rigidity of the entire cable. Consequently, it was believed that the cable had excellent flexibility.

A sample of the complete jacket 4 having a length of 150 cm was sampled from the completed optical fiber cable. The sample was treated at a temperature of 110° C. for two hours. The length of the jacket sample was measured before and after the heat treatment to obtain the value of the longitudinal shrinkage. The result was about 0.1%, which is sufficiently small. The optical fiber cable was subjected to a handling test. As anticipated, the test results demonstrated that the cable was easy to bend, which means the cable had excellent flexibility, and was reduced in bending tendency.

The optical fiber cable was also subjected to the combustion test stipulated by the UL 1666 riser test method. The test results were satisfactory in showing a maximum flame height of 180 cm (specified maximum: 360 cm) and a maximum temperature of 218° C. (specified maximum: 454° C.).

The present invention is explained mainly by referring to an optical fiber cable having a fiber ribbon in the above description. However, the present invention can also be applied to an optical fiber cable having multiple optical fibers stranded together to form a circular cross section. Furthermore, the present invention can also be applied to an optical fiber cable having one optical fiber.

The embodiments disclosed in this specification are to be considered in all respects as illustrative and not restrictive. The scope of the present invention is indicated by the following claims rather than by the foregoing description. All changes that come within the meaning and range of equivalency of the claims are therefore intended to be embraced in the scope of the present invention.

The entire disclosure of the Japanese Patent Application No. 2001-320071 filed on Oct. 18, 2001 including the specification, claims, drawings, and summary is incorporated herein by reference in its entirety.

What is claimed is:

1. An optical fiber cable, comprising:
 (a) at least one optical fiber;
 (b) a plastic jacket covering the optical fiber or optical fibers; and
 (c) at least one anti-shrink member that:
  (c1) is embedded in the jacket; and
  (c2) is intended to suppress the longitudinal shrink of the jacket;
the jacket having the property that the longitudinal shrinkage is at most 0.5% when a sample of the jacket including the anti-shrink member or members but excluding the optical fiber or fibers is heated at 110° C. for two hours;
the optical fiber cable having the properties that:
 (d) the remaining bend of the cable has a radius of curvature of at least 100 mm when a sample of the cable is wound on a mandrel having a radius of 50 mm, is secured there, is heated at 85° C. for two hours, and then is unwound from the mandrel; and
 (e) the deflection at the free end of a cantilever is at least 50 mm when the cantilever is formed by using a sample of the cable having a length of 30 cm and when the deflection is obtained by averaging the maximum deflection and the minimum deflection, wherein:
  (e1) the value of the maximum deflection is obtained by turning the cable sample around its own axis to find the position where the deflection at the free end is maximized due to the bending tendency of the cable sample; and
  (e2) the value of the minimum deflection is obtained by turning the cable sample again around its own axis to find the position where the deflection at the free end is minimized due to the bending tendency.

2. An optical fiber cable as defined by claim 1, the optical fiber cable having the dimensional relationship expressed as $$T_t \leq T_o + 0.2 \ (mm),$$

where $T_t$ is the total thickness of the jacket at the portion where the anti-shrink member or members are embedded, and $T_o$ is the thickness of the jacket at the portion where no anti-shrink member is embedded.

3. An optical fiber cable as defined by claim 1, wherein the anti-shrink member or members are coated with a bonding material by baking.

4. An optical fiber cable as defined by claim 1, the optical fiber cable further comprising a tension member surrounding the optical fiber or fibers and being surrounded by the jacket.

5. An optical fiber cable as defined by claim 3, wherein the bonding material has a thickness of at most 50 $\mu$m.

6. An optical fiber cable as defined by claim 3, wherein the bonding material before being applied onto the anti-shrink member or members is composed of an acrylic-resin-family bonding material dispersed in a solvent.

7. An optical fiber cable as defined by claim 6, wherein the jacket is made of polyvinyl chloride.

8. An optical fiber cable as defined by claim 1, wherein the anti-shrink member or members are made of glass-fiber-reinforced plastic.

9. An optical fiber cable as defined by claim 2, wherein the anti-shrink member or members are made of glass-fiber-reinforced plastic.

10. An optical fiber cable as defined by claim 3, wherein the anti-shrink member or members are made of glass-fiber-reinforced plastic.

11. An optical fiber cable, comprising:
 (a) at least one optical fiber;
 (b) a plastic jacket covering the optical fiber or optical fibers; and
 (c) at least one anti-shrink member that:
  (c1) is embedded in the jacket; and
  (c2) is intended to suppress the longitudinal shrink of the jacket;
the optical fiber cable having the properties that:
 (d) the ratio $ES_t/ES_j$ is at least 0.7, where $ES_t$ denotes the product of the Young's modulus and cross-sectional area of the anti-shrink member or the total value of the products of the Young's modulus and cross-sectional area of the anti-shrink members, and $ES_j$ denotes the product of the Young's modulus and cross-sectional area of the entire jacket including the anti-shrink member or members;
 (e) the ratio $EI_t/EI_c$ is at least 0.1, where $EI_t$ denotes the flexural rigidity of the anti-shrink member or the total value of the flexural rigidities of the anti-shrink members (the flexural rigidity is expressed by the product of the Young's modulus and the geometrical moment of inertia), and $EI_c$ denotes the flexural rigidity of the entire cable; and (f) the ratio $EI_c/M_c$ is at most $8 \times 10^6$ mm$^3$, where $EI_c$ denotes the flexural rigidity of the entire cable, and $M_c$ denotes the mass per unit length of the cable.

12. An optical fiber cable as defined by claim 11, the optical fiber cable having the dimensional relationship expressed as $$T_t \leq T_o + 0.2 \ (mm),$$

where $T_t$ is the total thickness of the jacket at the portion where the anti-shrink member or members are embedded, and $T_o$ is the thickness of the jacket at the portion where no anti-shrink member is embedded.

13. An optical fiber cable as defined by claim 11, wherein the anti-shrink member or members are coated with a bonding material by baking.

14. An optical fiber cable as defined by claim 11, the optical fiber cable further comprising a tension member surrounding the optical fiber or fibers and being surrounded by the jacket.

15. An optical fiber cable as defined by claim 13, wherein the bonding material has a thickness of at most 50 μm.

16. An optical fiber cable as defined by claim 13, wherein the bonding material before being applied onto the anti-shrink member or members is composed of an acrylic-resin-family bonding material dispersed in a solvent.

17. An optical fiber cable as defined by claim 16, wherein the jacket is made of polyvinyl chloride.

18. An optical fiber cable as defined by claim 11, wherein the anti-shrink member or members are made of glass-fiber-reinforced plastic.

19. An optical fiber cable as defined by claim 12, wherein the anti-shrink member or members are made of glass-fiber-reinforced plastic.

20. An optical fiber cable as defined by claim 13, wherein the anti-shrink member or members are made of glass-fiber-reinforced plastic.

* * * * *